United States Patent [19]
Gitman

[11] Patent Number: 5,028,409
[45] Date of Patent: Jul. 2, 1991

[54] METHOD AND APPARATUS FOR RECOVERING SULFUR FROM GASES CONTAINING HYDROGEN SULFIDE

[75] Inventor: Gregory M. Gitman, Duluth, Ga.

[73] Assignee: American Combustion, Inc., Norcross, Ga.

[21] Appl. No.: 484,440

[22] Filed: Feb. 21, 1990

Related U.S. Application Data

[63] Continuation of Ser. No. 224,560, Jul. 26, 1988, abandoned, which is a continuation-in-part of Ser. No. 31,604, Mar. 23, 1987, abandoned.

[51] Int. Cl.$^5$ ............................................. C01B 17/04
[52] U.S. Cl. ................................................. 423/574 R
[58] Field of Search ..................................... 423/574 R

[56] References Cited

U.S. PATENT DOCUMENTS 4,780,305 10/1988 Steppe ............................. 423/574 R

FOREIGN PATENT DOCUMENTS 2173780 10/1986 United Kingdom ............ 423/574 R
2187445 9/1987 United Kingdom ............ 423/574 R

*Primary Examiner*—Jeffrey E. Russel
*Attorney, Agent, or Firm*—Needle & Rosenberg

[57] ABSTRACT

A method of recovering sulfur from gaseous materials containing hydrogen sulfide is provided having the steps of reacting a first gaseous material with first oxidizing gas in a first reaction step to form first products of incomplete combustion including primary gaseous sulfur, sulfur dioxide and uncombusted hydrogen sulfide; cooling said first products of incomplete combustion in first cooling means; directing a first fraction of the cooled first products of incomplete combustion to first condensing means; condensing the first reaction of the cooled first products of incomplete combustion in the first condensing means to form collectable sulfur and gaseous product; reacting the gaseous products leaving the first condensing means and the remaining fraction of the cooled first products of incomplete combustion with second oxidizing gas in a second reaction step to form second products of incomplete combustion including gaseous sulfur; cooling the second products of incomplete combustion in second cooling means; and condensing the second gaseous sulfur from the cooled second products of incomplete combustion in second condensing means to form collectable sulfur.

1 Claim, 5 Drawing Sheets

METHOD AND APPARATUS FOR RECOVERING SULFUR FROM GASES CONTAINING HYDROGEN SULFIDE

This application is a continuation of application Ser. No. 07/224,569, filed July 26, 1988, now abandoned, which is a continuation-in-part of application Ser. No. 07/031,604, filed March 23, 1987, now abandoned.

BACKGROUND OF THE INVENTION

The present invention relates to an improved apparatus and method for recovering sulfur from gases containing hydrogen sulfide. More particularly, it relates to a method and apparatus which provides increased sulfur recovery and process flexibility and is for use in situations where admixtures such as ammonia, cyanic acid, hydrocarbons or other materials capable of interfering with certain steps of the process are present in the gas containing hydrogen sulfide. In addition, the method and apparatus of the present invention is useful when an increase in the capacity of the process is required.

The invention relates to a general process, known as the Claus process, which is used for sulfur recovery from gases containing hydrogen sulfide ($H_2S$). Such gases are often generated by petroleum refineries, natural gas processing plants, coke plants, ore processing operations and other industries. At refineries these gases are commonly classified into two groups: acid gases which are usually richer in $H_2S$, and sour gases which contain $H_2S$ and ammonia, ($NH_3$). Both gases may also contain $CO_2$, $H_2O$ and lesser quantities of hydrocarbons and other admixtures Depending on the $H_2S$ content, feed gases are usually classified as rich, lean or very lean. The approximate ranges of concentrations used in this classification are presented in Table 1, below, which also indicates the most typical process modifications that are used to treat feed gases with various $H_2S$ concentrations. The composition and flow rates of feed gases fluctuate widely over long time periods, and fluctuate dynamically due to changes in raw materials, technology and operation of the processes where the feed gases are generated.

TABLE 1

| Typical Ranges of $H_2S$ in Feed Gases and the Corresponding Claus Process Modification: | |
|---|---|
| $H_2S$ in Feed Gas (Mole Percent) | Modification |
| 50–100 (Rich Feed) | Straight through |
| 20–50 (Lean Feed) | Split flow |
| 10–20 (Lean Feed) | Split flow with preheating of the feed streams |
| <−10 (Very Lean Feed) | Sulfur recycle |

The straight through and split flow modifications of the Claus system were originally intended for treatment of clean acid gases composed of $H_2S$, $CO_2$ and $H_2O$. A typical straight through Claus system includes a furnace for partial combustion of hydrogen sulfide, a waste heat boiler, a sulfur condenser, several consecutive reheater/catalytic converter/condenser units, a tail gas treatment system and an exhaust stack. The entire hydrogen sulfide containing gas, as well as combustion air, is fed into the Claus furnace burner wherein one third of the hydrogen sulfide is combusted to form sulfur dioxide and water (Equation 1 below). Sulfur dioxide and hydrogen sulfide further react with each other in the reaction chamber of the Claus furnace to form sulfur and water (Equation 2). Reaction (2) is reversible and results in a temperature and pressure dependent equilibrium wherein the gas simultaneously contains $SO_2$, $H_2S$, elementary sulfur and water. These hot gases are exhausted from the reaction chamber into the boiler and the following condenser where they are rapidly quenched. Elementary sulfur is condensed at temperatures greater than the temperatures of water condensation and sulfur crystallization.

$$H_2S + 1.5O_2 = SO_2 + H_2O \tag{1}$$

$$SO_2 + 2H_2S = 3S + 2H_2O \tag{2}$$

The temperature dependent equilibrium which is established between the species presented in Eq. (2) influences the sulfur conversion in the thermal and catalytic process steps. The equilibrium between $SO_2$, $H_2S$, S and $H_2O$ in the Claus process is effected by admixtures to the feed gases, nitrogen in the combustion air and products of side reactions such as $H_2$ and CO. Considering all operable effects, the recovery of sulfur after the boiler and the first stage condenser typically ranges from 50% to 70%. The additional sulfur is recovered in the condensers of the subsequent reheating, catalytic conversion and condensation units. The temperature in the Claus furnace is usually suggested to be in the range from 1040° C. (1900° F.) to 1370° C. (2500° F.). The sulfur recovery across the entire Claus process train may be from 80% to 98%. Unreacted hydrogen sulfide and sulfur dioxide, water vapors and other admixtures are transferred from the Claus process to the tail gas treatment system where the sulfur containing constituents are further removed before the gas is discharges to the atmosphere.

When lean feed gases are treated in the conventional Claus process, the desirable furnace temperature cannot be reached in the straight through process modification utilizing air for combustion. Therefore, split flow modification is used wherein a fraction of the feed gases (usually about ⅔ of the total flow) by-passes the Claus furnace so that the furnace temperature is raised due to the near sfoichiometric combustion conditions produced. Further preheating of the feed gases may become necessary to achieve the desired furnace temperature at low $H_2S$ concentrations. In treating very lean feed gases, a fraction of sulfur may be recycled and used as a fuel in the Claus furnace while a substantial fraction or all of the feed gas by-passes the Claus furnace.

Recent modifications to the Claus process have been developed because many refineries and gas plants are using raw materials with much higher sulfur content than in past years. This increase in the total quantity of acid gases necessitates a capacity increase in the sulfur recovery in the existing Claus process. In addition, more stringent environmental regulations have required modifications to the Claus process to allow the treatment of several waste streams previously discharged to the environment and have required a greater efficiency of sulfur recovery. Additional modifications to the Claus furnace have been developed to allow the processing of waste streams such as sour gases that contain ammonia and other admixtures such as cyanic acid and hydrocarbons.

The capacity of the existing Claus systems cannot be increased by simply feeding more acid and/or sour gases and air. This increase in flow rates causes hydraulic losses across the system to increase. The pressure in the system also increases, thereby posing a danger of gas leakage through the sulfur legs which are used to discharge liquid sulfur from condensers. Simultaneously, the residence time of gases in all units of the system decreases with a respective drop in the system performance. The capacity of existing condensers, reheat units and converters may also be inadequate to receive additional heat load.

B. G. Goar, in U.S. Pat. No. 4,552,747, reviewed the use of oxygen instead of air in the conventional Claus process to increase system capacity without increasing the head losses and without decreasing the residence time. This is achieved by substituting quantities of nitrogen in the combustion air by feed gas and oxygen. In order to minimize furnace overheating due to removal of nitrogen from combustion gases, Goar suggested recycling a 5% to 60% fraction of the gases after the first condenser back into the reaction furnace zone in the Claus process. This recycle gas, at about 180° C. (350° F.), absorbs excessive heat generated in the furnace. The process is claimed to be applicable when the hydrogen sulfide content of the feed gas ranges from 60 to 100 mol% and when the recommended temperature of the reaction furnace zone is in the range of 1315° C. (2400° F.) to 1540° C. (2800° F.).

D. K. Beavon, in U.S. Pat. No. 4,279,882, reviewed problems associated with $NH_3$ in sour feed gases. Often flows of sour gases are small as compared to acid gases and can be added to the process without any substantial increase in flow rates and hydraulic losses. However, ammonia present in the gases tends to form solid substances while reacting with sulfur containing species, particularly with sulfur trioxide. Therefore, ammonia must be substantially destroyed in the Claus furnace prior to the boiler.

Beavon suggests that ammonia can be efficiently destroyed in a split flow process with two high temperature zones. The first zone is a combustion zone in the burner means fed with sour gas, with 33% to 66% acid gas and with all oxidizing air required in the process. This shifts the ratio of oxygen to combustible constituents in the combustion zone towards stoichiometric and results in higher temperatures. The remaining 67% to 34% of the acid gas by-passes the first zone and is fed into the second zone located in the adiabatic reaction chamber. The hot combustion products of the first zone are also transferred into the second zone wherein no additional oxygen is available for combustion.

A major problem with the Claus process, even with the above described modifications, is that each process modification has been developed for particular operating conditions, e.g. particular gas compositions and flow rates, and lacks adaptability to changing conditions. Accordingly, the wide range variations in the composition and flow rates of the feed gases, as well as substantial dynamic variations in composition and flow rates which occur at many plants, cannot be met by any known modifications of the process. Additionally, each process modification has certain limitations and disadvantages which preclude the most beneficial and reliable use of the Claus process. These limitations and disadvantages are related to the process thermodynamics; to the specifics of the combustion step such as mixing, turbulence, and reaction kinetics; to the specific properties of the feed gases and to the design features of the thermal and catalytic units of the Claus process. These limitations and disadvantages are subsequently discussed.

Shchurin P. M., Pliner V. M. and Nemirovskii M. S. (Gas Industry, No. 6, 1983, Russian) studied the thermodynamics of the thermal step of the Claus process and found that a temperature exists at which the maximum conversion of sulfur occurs. Thermodynamic analyses performed for feed gases of various compositions considering the major and minor constituents formed in the Claus process have demonstrated that the typical curves indicating sulfur conversion versus temperature have distinct minima which separate the left and right branches of each curve. Our calculations presented in FIG. 5 demonstrate the minimum and maximum of the curve. The left and right branches correspond to the predominant $S_8$ and $S_2$ formation and the right branches of these curves have maxima. The downward trend of the right branches at higher temperatures is mainly attributable to the dissociation of water, carbon dioxide and other constituents in the reacting gas mixture, which reduces sulfur conversion.

In Claus systems, the equilibria in accordance with the left branch occurs in the catalytic steps while the right branch equilibria occurs in the thermal conversion step. The maxima on the right branches correspond to the optimal temperatures in the thermal conversion step. The thermodynamic computations also demonstrate that the optimal temperatures in the thermal process steps can be obtained by adjusting the amount of nitrogen introduced in the furnace with the oxidizing gas by providing the optimum oxygen to nitrogen ratio. The optimum oxygen to nitrogen ratio can be provided when both oxygen and air is used to form the oxidizing gas and when the oxygen to air ratio can be dynamically controlled.

By virtue of their instrinsic properties, flame reactors never provide ideally uniform distribution of temperatures, concentrations and turbulence. These nonuniformities cause local deviations from the average thermodynamic equilibria. Additionally, the formation of the sulfur product in the Claus process depends on the heat transfer, on transport phenomena such as turbulence and molecular diffusion, on the kinetics of the chemical reactions and on the specific features of the system.

Destruction of ammonia occurs mainly through thermal dissociation and oxidation according to the following formulas:

$$2NH_3 = N_2 + 3H_2 \tag{3}$$

$$2NH_3 + 1.5\ O_2 = N_2 + 3H_2O \tag{4}$$

Due to nonuniform distributions of temperature, concentrations and gas velocities in the Claus furnace, the fraction of ammonia which breaks through the colder zones or zones with a local deficiency of oxygen will not be sufficiently destroyed. Hydrocarbons in feed gases are oxidized by oxygen as well as by water at high temperatures. The fraction of hydrocarbons breaking through the colder zones having a local deficiency of oxygen will also not be sufficiently destroyed. Diluting gases, such as nitrogen in combustion air and the nitrogen, water and carbon dioxide in the recycle gas of the Goar process, reduce the concentrations of $NH_3$ and $O_2$ in the reaction mixtures, shift the equilibrium of reactions (3) and (4) to the left and reduce the process rate.

Similarly, the degree and the rate of oxidation of hydrocarbons may be reduced.

Experience has proven that neither of the conventional Claus process modifications ensures the required ammonia destruction. Moreover, in split flow processes ammonia, hydrocarbons and other admixtures present in the fraction of the flow by-passing the furnace do not undergo the required thermal destruction. None of the existing modifications to the Claus furnace provide for significant destruction of ammonia in lean gases.

The Goar process modification is intended to increase the throughput of systems used for testing only rich feed gases. In this process the recycle gas laden with increased quantity of water dilutes the combustion products and tends to suppress sulfur conversion. Since the recycle rate is selected based upon the temperatures allowable by refractories, the optimal for sulfur recovery furnace temperature is not provided in the Goar process. Moreover, the heat loading rates on the furnace, boiler, first condenser, first catalytic reactor and second condenser are excessively high which necessitates substantial modifications of these units in order to accommodate for the increased throughput capacity of the system.

The complete destruction of ammonia does not occur in the full scale operation of the conventional Claus process due to low combustion temperatures, imperfect mixing and flow patterns in the combustion apparatus, nonuniform temperature distribution and the presence of water droplets in the feed gases.

Breakthroughs of a fraction of ammonia and other admixtures in the process of the Beavon patent may occur due to poor mixing of the feed gases in the first thermal zone, and due to the absence of the flame in the second thermal zone. Admixtures escaping the first zone and those introduced with the balance of the acid gas fed into the second zone are not subject to the flame reactions in the second zone and may be transferred further along the process train. Ammonia which escapes from the thermal process steps and sulfur species found in the furnace react to form solid salts capable of plugging the catalyst.

Additionally, the tail gases of the Claus process contain $CO_2$, $H_2O$, $N_2$ and traces of $H_2S$ and/or $SO_2$. After tail gas treatment, this gas stream may be used as a valuable source of $CO_2$ which can be separated and used for various industrial applications. The water can also be condensed and reused. Moreover, if $N_2$ is not present in the tail gas a zero discharge system can be developed.

There exists a need, therefore, for a method and apparatus which provides greater recovery of sulfur from gases containing hydrogen sulfide and also allows one to increase the throughput of systems of a given size without substantial modification or existing thermal and catalytic stages.

There exists a further need for such a method and apparatus which is adaptable to long term changes in operating conditions and which provides sufficient flexibility to meet short and long term dynamic variations in the composition and flow rate of the feed gases.

There exists yet a further need for such a method and apparatus which provides efficient ammonia destruction in the feed gases by insuring proper temperature, time and turbulence conditions for ammonia contaminated feed gases in the Claus furnace.

There is also a need to eliminate, if possible, the gaseous emission in the atmosphere with simultaneous recovery of $CO_2$ and possible recycling of water.

SUMMARY OF THE INVENTION

The present invention relates to the Claus process and provides an apparatus and method for improved recovery of sulfur from gas streams laden with hydrogen sulfide. Some of these streams may contain predominantly hydrogen sulfide, for example, acid gas, while others may contain hydrogen sulfide and ammonia, or so called sour gas. These gas streams also contain water vapors and may carry water droplets, hydrocarbons, cyanic acid and minor admixtures. Additionally, the gas streams may have a wide range of hydrogen sulfide concentrations and caloric values.

When only one feed gas is treated in the Claus process, for example acid gas, the gas and two oxidizing gases having different oxygen concentration are supplied to either a single or multiple combustion burner attached to the reaction chamber of the Claus process. For example, a combination of two of either air, oxygen or oxygen enriched air may be used to form the oxidizing gases. The ratio of oxygen to nitrogen supplied by the two oxidizing gases is set at such a level that the optimal adiabatic temperature in the reaction chamber is provided, thereby resulting in the maximized sulfur conversion in the combustion step.

When a throughput capacity increase is required, as for a rich acid gas, the air feed is reduced and the oxygen feed is increased, resulting in reduced total mass and reduced volumetric flow of gases across the Claus process as compared with air as a sole oxidizer. In such a case, the adiabatic temperature of combustion should be controlled at the optimal level for sulfur conversion and below the level allowed by the refractories. Maximium throughput capacity can be achieved when oxygen is used as a sole oxidizer.

Several alternatives can be used to prevent excessive temperature rise of combustion products. An intermediate cooling of combustion products can be accomplished by the use of an intermediate heat exchanging means installed prior to or within the secondary combustion step. Water injection can be provided within or between combustion steps. Preferably, water temperature should be near the boiling point which insures better water dispersion into fine droplets and rapid vaporization of droplets.

A further process improvement intended to increase the throughput capacity of the Claus process is the use of two or more consecutive combustion stages, the last of which is followed by a series of catalytic stages. Each combustion stage includes a burner, a reaction chamber, a boiler and a condenser for sulfur removal. The first combustion stage is fed with all or a major fraction of the feed gas and a fraction of the total required oxygen. The remaining feed gas, if any, and oxygen are fed in the second combustion stage. Deficient oxygen supply in the first stage insures that overheating does not occur. The sulfur removal in the first combustion stage reduces the load on the second stage and on the following catalytic stages. The feed rate of gases into the first and second combustion stage is selected such that in a case of upgrading an existing Claus systems with a single combustion step, such system needs no or only minor modifications.

When lean acid gases are fed in the system and/or when the throughput of lean gases in the system should be increased, a combination of air and oxygen, or oxygen enriched air, is used to increase the temperature to the optimal levels. When yet leaner gases are fed into the system, a supplementary fuel may be used in order to reach optimum temperature. Sulfur and/or liquid or gaseous hydrocarbons may be used as the supplementary fuel. Additional fuel can be used separately or in combination with preheated air to further improve the ability of the process to provide the optimal temperature and maintain a stable flame in the combustion process step.

In order to achieve maximum throughput capacity of the Claus system, pure oxygen can be used as a sole oxidizer. Additionally, after the tail gas treatment in such systems, the remaining gas is composed of $CO_2$ and $H_2O$, with only very minor quantities of other admixtures. Both $CO_2$ and water can be recovered as by-products of the Claus process utilizing pure oxygen.

A further improvement of the Claus process is provided by feeding the major fraction of the total oxygen in the combustion stage to support a $H_2S/SO_2$ ratio of above 2 in accordance with Eqs. (1) and (2), and by feeding the residual quantity of oxygen upstream of the subsequent catalytic steps such that the $H_2S/SO_2$ ratio approaches 2 at the final catalytic stage. Such a strategy allows the maximization of sulfur recovery in each step by providing an excess of $H_2S$. Reduction of the total oxygen fed into the Claus furnace results in a reduction of heat released by combustion and in the combustion product temperature. In addition, this reduction provides more room for throughput capacity increase. Introduction of the remaining oxygen in the catalytic steps may be accomplished by either the use of reheat burners or by mixing with the gases fed in reheat units of other types.

A further process improvement is related to the two stage combustion of feed gases in the burner means consisting of two combustion zones fed with portions of the involved oxygen. Hydrogen sulfide containing gases also may be introduced as fractions separately fed into the combustion chambers. The ability to introduce different amounts of oxygen, nitrogen and $H_2S$ in each of these chambers makes it possible to control separately the temperature in each chamber and provides the optimum temperature for maximum sulfur recovery from the products of incomplete combustion finally entering the boiler. The temperature achieved in the primary combustion zone may be significantly increased to insure destruction of ammonia, hydrocarbons and other admixtures. At the same time the final temperature of the combustion products transferred from the second stage into the reaction chamber will be maintained at the optimal level for maximum sulfur recovery.

The oxidizing gases used in each combustion step may be oxygen, oxygen enriched air or air. Temperatures, retention time and turbulence developed in these combustion steps are sufficient for virtually complete combustion of admixtures.

When the sour feed gas is a lean gas and the desired temperatures for destruction of ammonia and other admixtures cannot be developed by rising the oxygen content of oxidizing gases, a fuel can also be fed into the primary combustion chamber. A richer second feed gas, sulfur or supplementary liquid or gaseous hydrocarbons may be used as a fuel.

A split flow process modification can also be used with the two step combustion of feed gases. The two step combustion modification can also be operated with a deficient oxygen supply to maximize sulfur conversion by the use of the deficiency of oxygen in the furnace and introducing remaining oxygen upstream of catalytic converters downstream of the furnace. Preheating of the combustion air and lean feed gases can also be used to reach optimal temperatures for sulfur conversion.

As an additional feature, control systems may be provided for the single combustion step and two-step combustion modifications to optimize the Claus process.

In the single combustion step, flows of the feed gas, the first and second oxidizers, the supplementary fuel, if any, and/or water, if any, are measured and the respective signals are transmitted to a computing-control means such as a computer. The total hydraulic head loss across the Claus process is also measured and the respective signal is fed in the control means. The control means actuates flow controllers to adjust the feed rates of the first and second oxidizers, as well as supplementary fuel or water, if any, so as to maintain the total oxygen requirement as needed, and headloss below the allowable level. To accomplish the control actions, the software at the control means may include a program for thermodynamic analysis of sulfur conversion which computes the curve such as illustrated in FIG. 5 and determines the optimal temperature level based on the maximum of the computed curve. This optimal temperature of combustion products entering the heat recovery boiler is maintained by controling the ratio of oxygen delivered from air and from oxygen sources.

In two-step combustion modifications, temperatures are measured in both combustion steps and the signals are transmitted to the control means. The control means operates the motorized flow controllers to adjust the distribution of the two oxidizing gases between the primary and secondary combustion steps to provide the optimal first step temperature for the destruction of admixtures and to provide optimal temperature for maximum sulfur conversion in the products of incomplete combustion entering the heat recovery boiler. The control means is also used to control the optimal total amount of oxygen in oxidizing gases in order to maintain the desired $H_2S/SO_2$ ratio.

When the Claus process is conducted with a deficiency of oxygen in the furnace resulting in a $H_2S/SO_2$ ratio above 2 in gases leaving the boiler, the control system may be further improved by using the $H_2S/SO_2$ ratio measured by analyzers installed after one or more catalytic conversion steps. The electrical signals of $H_2S/SO_2$ ratios are fed into the control means which, in turn, operates the motorized flow controllers to adjust auxiliary flows of the oxidizing gases being fed downstream of the heat recovery boiler prior to the catalytic conversion step. This provides optimal $H_2S/SO_2$ levels resulting in maximum sulfur conversion in each process step and, therefore, in the entire system.

In the two thermal stage Claus system the quantity of the oxygen fed in the first stage provides a $H_2S/SO_2$ ratio after the first stage substantially greater than 2. This results in lower combustion temperatures when rich gases are treated with large portions of oxygen in the oxidizing gas. The balance of oxygen can be fed in the second thermal stage since the feed gas transferred from the first thermal stage into the second thermal stage is moderately lean, however combustible. The second stage temperature will also be acceptable. Further flexibility in the temperature control and sulfur conversion may be achieved by either passing the feed gas around the first stage and/or by passing the combustion products after the first stage condensor around the second combustion stage. Bypasses may be most helpful when the flow rate of rich feed gases is less than the maximum design capacity or when heavier feed gases are used.

Two thermal stages can be operated in parallel, wherein a portion of the feed gas bypasses the first stage and the entire flow of gases from the first stage condenser bypassed the second thermal stage.

It is an object of the present invention, therefore, to provide a method and apparatus which provides greater recovery of sulfur from gases containing hydrogen sulfide.

It is also an object of the present invention to provide a method and apparatus for efficient destruction of ammonia and other admixtures in feed gases.

It is another object of the present invention to provide a method and apparatus which increases the throughput capacity of a Claus system.

It is a further object of the present invention to provide a method and apparatus which is adaptable to long term changes in operating conditions within the system.

It is still a further object of the present invention to provide a method and apparatus which has sufficient flexibility to meet short term variations in the compensation and flow rate of the feed gases entering the system.

It is a further object of the present invention to provide a method and apparatus which results in zero emissions to the environment by the recovery of waste $CO_2$ and water from exhaust gases.

DETAILED DESCRIPTION OF THE PREFERRED EMBODIMENT

The preferred embodiment is now described with reference to the drawings, in which like numbers indicate like parts throughout the views.

Figure 1:
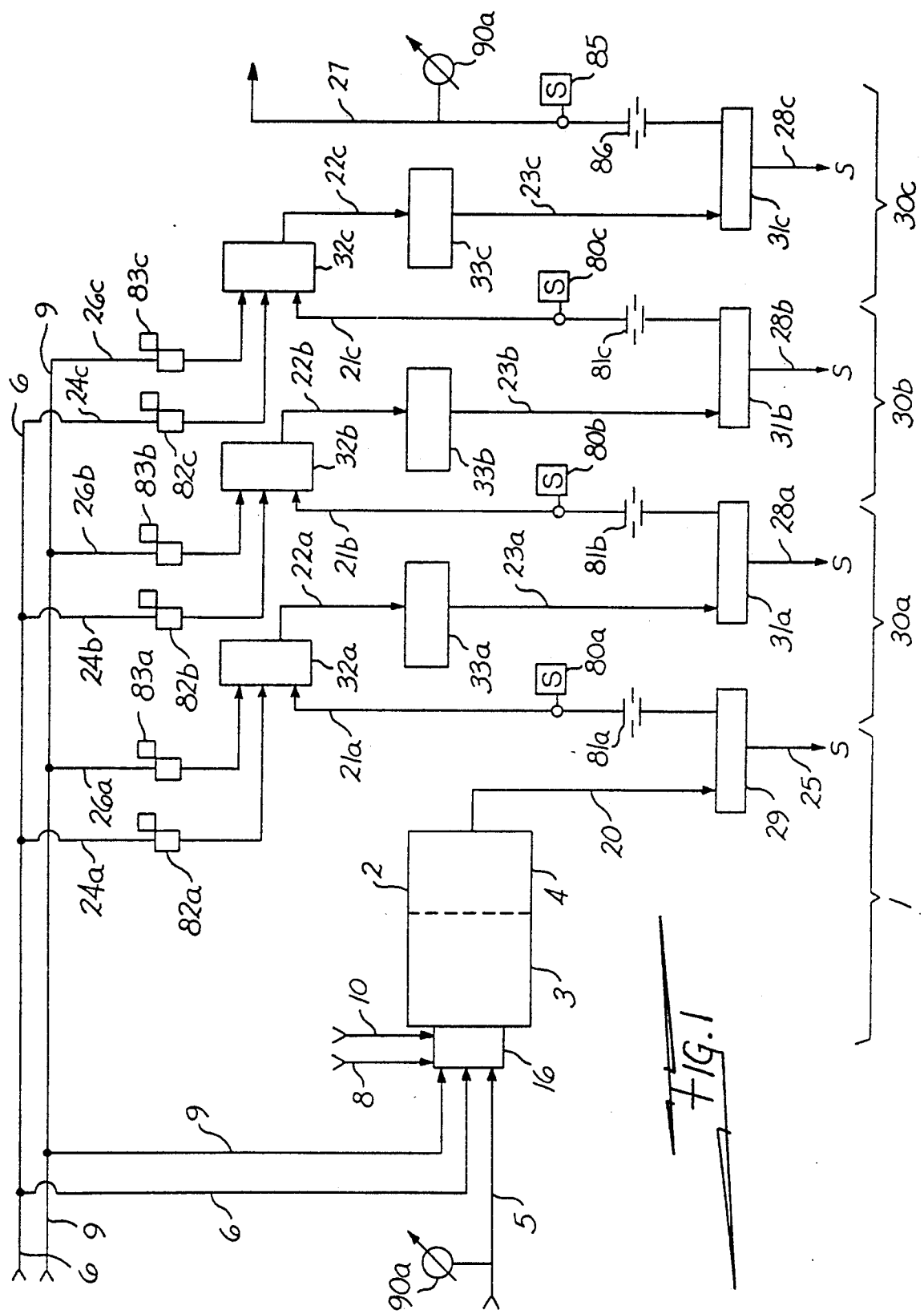
FIG. 1 is a schematic of the improved Claus system of the present invention.

FIG. 1 shows an improved Claus system. The system includes a combustion stage 1, and a series of catalytic stages 30$a,b,c$.

The combustion stage 1 includes a combustion unit 2, which act as means for reacting gaseous material containing hydrogen sulfide to form gaseous sulfur and a primary sulfur condenser 29. The combustion unit 2 is comprised of burner means 16, which may be embodied as a one-step burner or multi-step burner as presented in FIG. 2, a reaction chamber 3, and a waste heat boiler 4; all of which are used in thermally combusting a first feed gas of hydrogen sulfide containing gaseous material. The feed gas is supplied to the burner means 16 through a first feed gas line 5. A first pressure transducer 90$a$ is provided for measuring the pressure of the gas in the feed line 5. A first primary oxidizing gas is supplied to the burner means 16 through a first primary oxidizing gas line 6, and a first secondary oxidizing gas is supplied to the burner means 16 through a first secondary oxidizing gas line 9. An auxiliary fuel line 8 and a water line 10 may also be provided for delivering auxiliary fuel or water, respectively, to the burner means 16. The primary sulfur condenser 29 is connected to the waste heat boiler 4 of the combustion unit 2 by a primary condenser feed line 20, through which the condenser 29 receives products of incomplete combustion containing gaseous sulfur and condenses the gaseous sulfur into a collectable state. Primary means for removing sulfur 25 from the system is also provided.

Each individual catalytic stage 30 is comprised of, in series, a reheating unit 32$a,b,c$ for maintaining sulfur in catalytic beds in catalytic converters in a vaporized state, a catalytic converter 33$a,b,c$; and a secondary condenser 31$a,b,c$. Secondary means for removing sulfur 28$a,b,c$ are provided on each condenser 31$a,b,c$. A reheating unit feed line 21$a,b,c$ is provided to carry gas to the reheating units 32$a,b,c$ from a preceding condensor, either the primary condenser 29, or a secondary condenser 31$a,b$. A $H_2S/SO_2$ ratio measuring probe 80$a,b,c$, is located along each reheating unit feed line 21$a,b,c$; as well as a flow metering means 81$a,b,c$ for measuring flow rates within each line 21$a,b,c$. A catalytic converter feed line 22$a,b,c$ carries gas from the reheating means 32$a,b,c$, to the catalytic converter 33$a,b,c$. A secondary condenser feed line 23$a,b,c$ is also provided to carry gas from the catalytic converter 33$a,b,c$ to the secondary condenser 31$a,b,c$.

A second primary oxidizing gas feed line 24$a,b,c$ and a second secondary oxidizing gas feed line 26$a,b,c$ are provided for delivering primary oxidizing gas and secondary oxidizing gas to the reheating unit 32$a,b,c$, respectively. Second feed lines 24$a,b,c$ and 26$a,b,c$ may be connected to, or independent of, first feed lines 6 and 9. Located on each second feed line 24$a,b,c$ is a primary gas flow modulating means 82$a,b,c$, and on each second feed line 26$a,b,c$, is a secondary gas flow modulating means 83$a,b,c$.

A tail gas line 27 is provided to carry tail gas from the final condenser 31$c$ of the final catalytic stage 30$c$ to tail gas treatment means. Located on the tail gas line 27 is a tail gas $H_2S/SO_2$ ratio measuring probe 85, a tail gas flow metering means 86.

Pressure transducers 90$a$ and 90$b$ are provided for indicating the pressure of gas flowing through feed gas line 5 and tail gas line 27, respectively.

Figure 2:
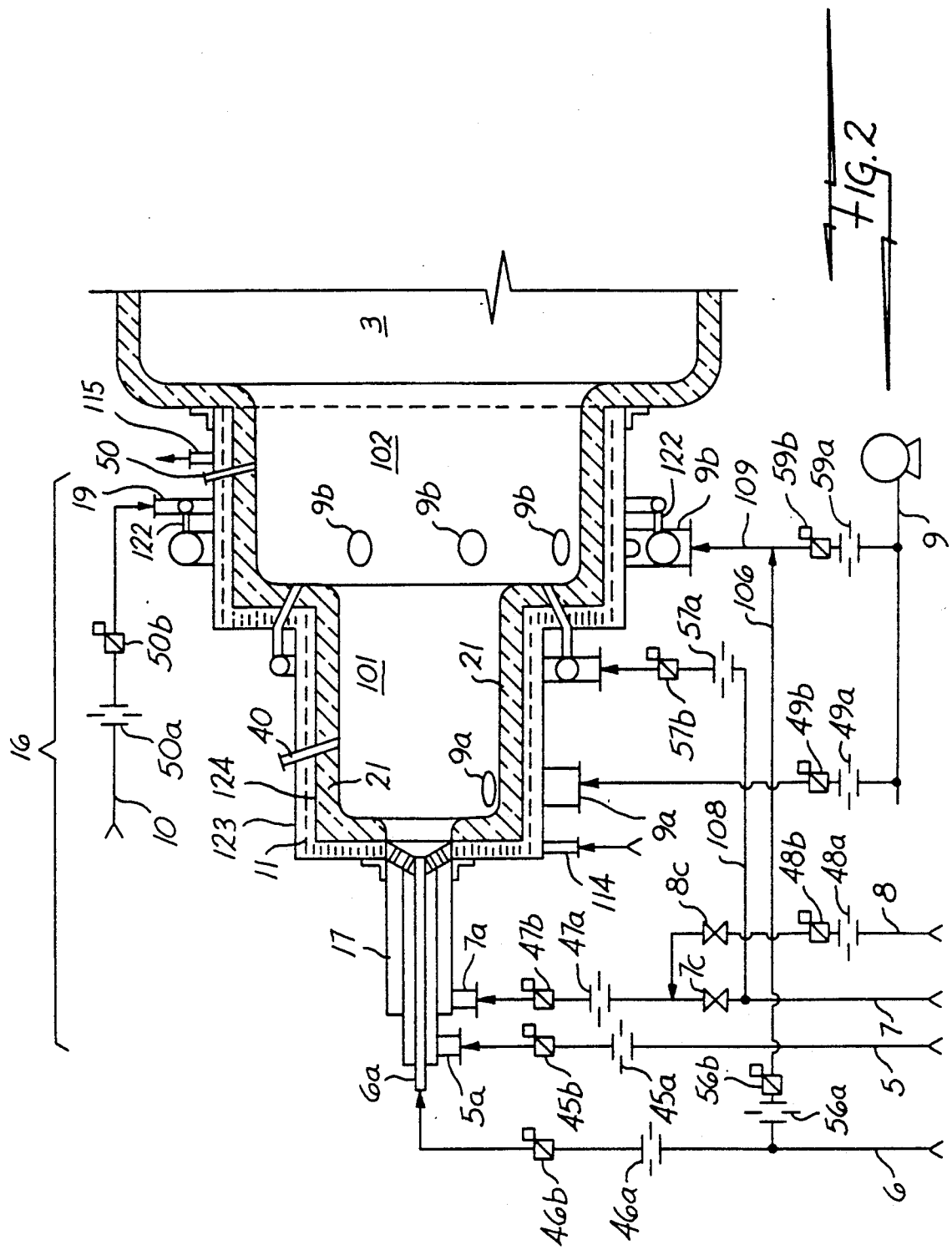
FIG. 2 is a cross-sectional view of a burner for use in the improved Claus system of the present invention.

FIG. 2 shows improved burner means 16 for use in the Claus system above. The means 16 is comprised of a preliminary burner 7$a$ which is connected to a primary combustion chamber 101, which communicates with a secondary combustion chamber 102, which in turn communicates with the reaction chamber 3. The first feed gas line 5 is provided to supply feed gas into the preliminary burner 17. A second feed gas line 7 is to supply a second feed gas to the preliminary burner 17. Additionally, a connecting second feed gas line 108 is provided to supply the second feed gas, if any, directly to the secondary combustion chamber 102.

The first primary oxidizing gas is introduced into the preliminary burner 17 from the primary oxidizing gas feed line 6$a$ and first secondary oxidizing gas, if any, is likewise introduced from the secondary oxidizing gas feed line 9 through secondary oxidizing gas inlet 9$a$. In addition, a connecting secondary oxidizing gas feed line 109 is provided for supplying secondary oxidizing gas, if any, directly to the secondary combustion chamber 102. A connecting primary oxidizing gas feed line 106 supplies primary oxidizing gas to the connecting secondary oxidizing gas feed line 109, where the two oxidizing gases may mix before entering the secondary combustion chamber 102 as one combined stream. Water, if any, is supplied by water line 10 to first distribution means 19, which is connected to second distribution means 9b by connecting pipes 122. The optional second distribution means 9b is in turn connected to the connecting secondary oxidizing gas feed line 109, and water therefor can be injected along with or separately from secondary oxidizing gas into the secondary combustion chamber 102.

The optional auxiliary fuel line 8 is connected to the second feed gas line 7 so as to mix auxiliary fuel with the second feed gas before the two enter the preliminary burner 17. A separate fuel line may also be provided. Shut-off valves 7c and 8c are located on the second feed gas line 7 and auxiliary fuel line 8 to provide means for shutting off flow of auxiliary fuel after an initial preheating of the chamber 3 and boiler 4 is completed and to allow the feed of the entire second gas flow, if any, in the second combustion step.

Primary 101 and secondary 102 combustion chambers are lined with refractories 21 and may be water-cooled using water jacket 11 formed by shells 123 and 124. Cooling water inlet 114 and outlet 115 are connected to the jacket 11 to provide water to, and remove water from, the jacket, respectively.

Flow metering means 45a, 46a, 47a, 48a, 49a, 50a, 56a, 57a, and 59a, as well as flow controlling means 45b, 46b, 47b, 48b, 49b, 50b, 56b, 57b, and 59b, are located on feed lines 5, 6, 7, 9, and on feed lines 106, 108 and 109, respectively.

A primary temperature metering means 40 is present in the primary combustion chamber 101, and a secondary temperature metering means 50 is present in the secondary combustion chamber 102. The flow metering means 45a, 46a, 48a, 49a, 56a, 57a, 59a, and the temperature metering means 40 and 50 are electrically connected to the computing-controlling means reference above in regards to FIG. 1. The computing-controlling means (not shown) are, in turn, electrically connected to the flow controlling means 45b, 46b, 47b, 48b, 49b, 50b, 56b, 57b and 59b.

Figure 3:
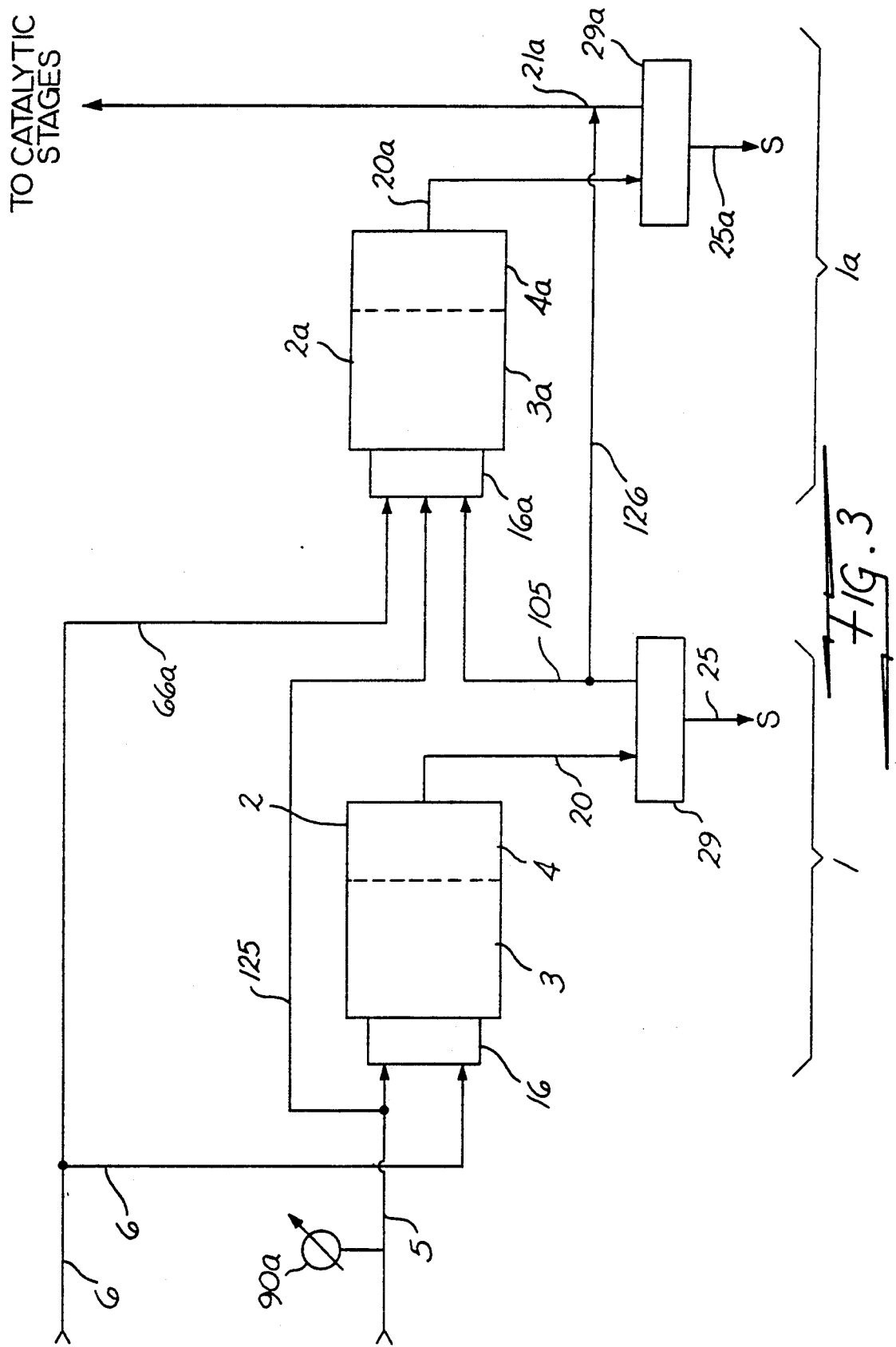
FIG. 3 is a schematic of the improved Claus system having two thermal stages.

FIG. 3 shows a further improvement of the Claus system. The system includes two combustion stages 1 and 1a in series, and a series of catalytic stages 30a,b,c such as shown in FIG. 1.

The combustion stage 1 includes a combustion unit 2 and a primary sulfur condenser 29. The combustion unit 2 is comprised of burner means 16, which may be embodied as a one-step burner or multi-step burner as presented in FIG. 2, a reaction chamber 3, and a waste heat boiler 4; all of which are used in combusting a first feed gas of hydrogen sulfide containing gaseous material. The feed gas is supplied to the burner means 16 through a first feed gas line 5. A first pressure transducer 90a is provided for measuring the pressure of the gas in the feed line 5.

A primary oxidizing gas is supplied to the burner means 16 through a first primary oxidizing gas line 6, and a first secondary oxidizing gas, if any, is supplied to the burner means 16 through a first secondary oxidizing gas line. An auxiliary fuel line or a water line may also be provided for delivering auxiliary fuel or water when needed, respectively, to the burner means 16. The primary sulfur condenser 29 is connected to the waste heat boiler 4 of the combustion unit 2 by a primary condenser feed line 20, through which the condenser 29 receives products of incomplete combustion containing gaseous sulfur. Primary means for removing sulfur 25 from the system is also provided.

A second combustion stage 1a, which acts as second reacting means, includes a combustion unit 2a and a primary sulfur condenser 29a. The combustion unit 2a is comprised of burner means 16a, which may be embodied as a one-step burner or a multi-step burner as presented in FIG. 2, a reaction chamber 3a, and a waste heat boiler 4a; all of which are used in combusting a first feed gas of hydrogen sulfide containing gaseous material. The feed gas is supplied to the burner means 16a thorugh a line 105 connecting the first stage 1 to the second stage 1a. A first primary oxidizing gas, if any, is supplied to the burner means 16a through a first primary oxidizing gas line 6a, and a first secondary oxidizing gas is supplied to the burner means 16a through a first secondary oxidizing gas line. An auxiliary fuel line or a water line may also be provided for delivering auxiliary fuel or water, respectively, to the burner means 16a. The primary sulfur condenser 29a is connected to the waste heat boiler 4a of the combustion unit 2a by a primary condenser feed line 20a, through which the condenser 29a receives products of incomplete combustion containing gaseous sulfur. Primary means for removing sulfur 25a from the system is also provided. To aid temperature control and thereby further increase sulfur removal, means for directing a portion of the products of incomplete combustion leaving the primary condensing means directly to the catalytic stages 30a,b,c. may be provided by line 126. Also, the two reacting means may be all consecutive or all parallel, based upon the fraction that is used.

Catalytic stages 30a,b,c in this embodiment may be similar to that shown in FIG. 1. Two or more feed gases with different compositions may be fed in the burner means 16 and 16a. Preferably, gases with admixtures are fed in the first combustion steps 1 and undergo combustion in both steps 1 and 1a.

OPERATION OF THE APPARATUS

Depending on the variations in composition and flow rate of feed gases, the process can be adapted to various modes of operation. The following are descriptions of several preferable modes of operation, including treatment of ammonia laden (sour) gas and acid gas, feed gases with hydrocarbons, lean feed gases and rich feed gases when an increased capacity of the process is required. These gases may carry water droplets, as well as minor admixtures.

Referring now to FIG. 1, the burner means 16 receives an acid feed gas via line 5, and the first and the second oxidizing gases via lines 6 and 9. The total quantity of oxygen delivered to the burner means 16 approximately conforms with the $H_2S/SO_2$ ratio equal to two as given by the following equations:

$$H_2S + 1.5O_2 = SO_2 + H_2O \tag{1}$$

$$SO_2 + 2H_2S = 3S + 2H_2O \tag{2}$$

The feed gas is ignited by the use of the primary burner 17 and the flame is developed in primary 101 and secondary 102 combustion chambers and is discharged into the reaction chamber 3. A fraction of $H_2S$ reacts in the flame with the oxygen provided with the first and second oxidizing gases to form $SO_2$. The $SO_2$ formed reacts with the remaining $H_2S$ to form sulfur and water. Because two oxidizing gases are used, for example, air and oxygen, a ratio between the oxidizers can be selected such that the optimal adiabatic temperature is maintained in the combustion unit 2. The ability to increase temperature to the optimal level is provided by controlling the amount of nitrogen introduced with oxidizing gases. Decreasing the fraction of oxygen supplied with air increases the quantity of heat available for raising the temperature of combustion products to the optimal level. The sulfur formed in the combustion stage of the Claus process is condensed in the primary condenser 29. The remaining flow of the treated gases is directed to the catalytic process stages 30a,b,c.

The process may be further improved by feeding into burner means 16 a deficient quantity of oxygen supplied with the first and second oxidizing gases. This results in an excess of $H_2S$ in the reaction chamber 3 ($H_2S/SO_2 > $ two). The excess of $H_2S$ shifts the equilibrium in the reaction towards formation of greater quantities of sulfur. A ratio between flows of oxidizing gases and total quantity of oxygen fed to burner means 16 are selected such that the optimal excess of $H_2S$, in addition to optimal combustion temperature, is provided in the reaction chamber 3 to further increase sulfur conversion. The balance of oxygen as required in accordance with Eqs. (1) and (2), above, to approach preferred $H_2S/SO_2$ ratio of two is added to the gases being treated prior to the first catalytic stage 30a.

The process can be further improved by split feeding the remaining fractions of oxygen upstream of each at least one catalytic stage to maximize sulfur conversion.

When an increase in the throughput capacity of the existing Claus process becomes limited by hydraulic losses across a system using air as a single oxidizing gas, another oxidizing gas having greater oxygen content than air can be used to overcome the limitation. The hydraulic losses in the modified system can be reduced due to the elimination of a fraction of nitrogen from the gases passing across the Claus train. If the adiabatic flame temperature exceeds the optimal level, liquid $H_2O$ can be added through water line 10 to bring the process temperature to the optimum level. Since water has a high latent heat of vaporization, the required cooling of products of combustion of rich gases with the use of a large quantity of a high oxygen content oxidizing gas can be achieved with the addition of a small quantity of water. The required quantity of cooling water is about half of that used in previously known process modifications, wherein water vapor is recycled. Accordingly, greater throughput capacity and greater sulfur recovery is achieved. The process may be further improved by using a deficient oxygen feed to provide two beneficial effects, namely, a reduction in the adiabatic flame temperature and maximization of sulfur conversion. Preferably, water fed in the burner means 16 should have a temperature close to but below boiling point so that dispersion of the injected water and its vaporization are improved.

Referring now to the combustion burner illustrated in FIG. 2, feed gas and the first and second oxidizing gases are fed through lines 5, 6 and 9 into the combustion chamber 2. The proportion of the first and second oxidizing gases is selected such that the quantity of nitrogen in the combustion products is reduced and the temperature of combustion gases is raised and maintained at the optimal level. This results in maximum sulfur recovery. For very lean gases, the cost of providing the required proportion of the high oxygen content oxidizing gas may become excessive. In these situations a small quantity of recycled sulfur and/or a high heat value hydrocarbon auxiliary fuel can be added via auxiliary fuel line 8, the combustion air and feed gas can be preheated and a part of the feed gas may be directed according to traditional split flow arrangements so as to reduce operational costs and to maintain optimal process temperature. A preferred hydrocarbon auxiliary fuel should be characterized by a high carbon to hydrogen ratio so that the amount of water formed is minimized. For very lean gases, the water cooled jacket 11 may be substituted with a heat insulation material.

Sour gas containing hydrogen sulfide, ammonia and possibly cyanic acid and the first and second oxidizing gases are directed into the preliminary burner 17 and ignited. The flame propagates into the primary combustion chamber 101. The amount of oxygen supplied with the oxidizing gases through the oxidizing gas lines 6 and 9 can be either substoichiometric, stoichiometric or above stoichiometric requirements based on complete combustion of $H_2S$ and admixtures in chamber 101. The ratio between the first and second oxidizing gases used are such that the adiabatic flame temperature in the primary combustion chamber 101 provides for the rapid vaporization of water droplets and for the virtually complete destruction of ammonia and other admixtures. This adiabatic flame temperature may reach up to 1430° C. (2600° F.).

In a wide range of sour gas compositions, temperatures sufficiently high for the rapid vaporization of water droplets, if any, and for the destruction of ammonia and cyanic acid can be insured by varying the oxygen content and the flow of the oxidizing gas introduced to the preliminary burner 17. For sour gases and acid gases treated simultaneously, a fraction of acid gases can be fed via line 7 in the burner 17 in order to insure high temperature in the primary combustion chamber 101. For lean acid gases an auxiliary fuel can be optionally fed by line 8. In the case of high water content and leaner gases, a water soluble fuel, such as alcohol, may be used.

Greater efficiency of ammonia destruction as compared with existing methods utilizing air and a fraction of acid gases in a first combustion step in the primary combustion chamber 101 is achieved due to the elevated concentrations of oxygen and ammonia in the primary combustion chamber 101, and due to the higher temperatures achieved with reduced nitrogen content in the oxidizing gas. These effects combined with the high mixing intensity in the primary combustion chamber 101 also result in a high ammonia thermal dissociation and oxidation rate. The high mixing intensity in the primary combustion chamber 101 is also achieved due to the smaller mass of gases which need to be mixed when oxygen is used instead of air and due to the substantially higher oxygen supply pressure.

Additionally, when only sour gas and oxygen are fed in the first combustion step, a smaller reactor volume for this step is needed. The small required volume of the first combustion step provides further improvements in the mixing conditions, and the elimination of nitrogen conventionally fed with oxidizing air. results in a reduction in the sizes and volumes of all subsequent units in the Claus process. Very high temperatures (above 1540° C. or 2800° F.) can be maintained in the refractory lined water cooled primary combustion chamber 101, thus improving further the destruction of ammonia.

A second feed gas and the second oxidizing gas are fed into the secondary combustion chamber 102 through a second feed gas line 7 and a second oxidizing gas distribution means 9b, respectively. Preferably, the second feed gas and/or the second oxidizing gas are introduced into the secondary combustion chamber 102 tangentially while the hot gases from the first combustion step are directed along the axis of the chamber 102. The oxygen content in the second oxidizing gas fed in the secondary combustion chamber 102 may be increased by mixing with the first oxidizing gas provided via line 106.

The combined flow of combustion products from the first combustion step and those fed into the second combustion step continue to be heated and oxidized in the second combustion step. The flame formed in this step may extend into the reaction chamber 3.

This arrangement of streams fed into the second combustion chamber 102 insures that the minor ammonia fraction which may break through the primary combustion chamber 101 has a second chance to be destroyed in a flame combustion zone in the presence of additional oxygen introduced with the second oxidizer. Controlling the ratio between the first and second oxidizing gases in the secondary combustion chamber 102 allows the temperature of combustion products to be brought close to the optimal value to insure maximum sulfur recovery prior to entering the waste heat boiler 4.

Other variations are also possible, for example, two-step combustion of feed gases with an intermediate cooling of combustion products after the first combustion step prior or during the second combustion step by the use of a heat exchanger means installed inside the burner means may be provided. Further, an additional heat recovery boiler followed by an intermediate condenser may be used in a two thermal stage process modification.

Referring now to FIG. 3, either all or the major fraction of the rich feed gas is delivered into the first combustion stage 1 via line 5. An oxidizer is fed in the thermal stage 1 by line 6. A fraction of $H_2S$ is combusted in the burner means 16 and the combustion gases pass through the reaction chamber 3 wherein sulfur is formed, the waste heat boiler 4 where the bulk of the heat of combustion gases is removed, line 20 and primary condenser 29, where sulfur is condensed, and then removed via line 25. Approximately 50 to 70% sulfur may be removed in the first combustion stage 1. The gases exiting the primary condenser 29 contain sulfur species mainly in the form of $H_2S$.

The temperature control during the first combustion step is provided by controlling the fraction of oxygen supplied with oxidizer into the first combustion stage 1 and by controlling the fraction of the feed gas delivered into the first combustion stage 1.

The gas discharged from the primary condenser 29 is fed via line 105 and the fraction of the feed gas by-passing the first combustion stage 1 is fed via line 125 into the second combustion stage 1a. The remaining balance of oxidizer is fed in the second combustion stage 1a by line 66a. A fraction of $H_2S$ is combusted in the burner means 16a and the combustion gases pass through the reaction chamber 3a wherein sulfur is formed, further through the waste heat boiler 4a where the bulk of the heat of combustion gases is removed. The gas from the waste heat boiler 4a further passes through line 20a and primary condenser 29a where sulfur is condensed and removed via line 25a.

The gaseous product from the primary condenser 29a is transferred to catalytic stages 30a,b,c via line 21a.

Further improvement of the two combustion step process is provided by the use of two oxidizing gases having different oxygen content to optimize the process temperature and accordingly the total sulfur recovery in the combustion stages as previously described. When recovery of pure $CO_2$ and/or zero emissions into the atmosphere are also objectives of the Claus process, pure oxygen is used in thermal process steps 1 and 1a, as well as in the catalytic steps 30a,b,c where oxygen is used in catalytic steps.

Yet further improvement of the two-step process is provided by feeding a fraction of gases after the first step condenser 29 via line 126 into the reheater in the catalytic step 30a.

In either process modification described herein, when oxygen is used as a sole oxidizer, $CO_2$ and water can be separated from treated tail gas, for example, by water condensation, and recycled as by products of the modified Claus process.

Referring again to FIGS. 1 and 2, a control system is provided and operates as follows. The controlling-computing means receives signals from flow metering means 45a, 46a, 47a, 48a, 49a, 50a, 56a, 57a, 59a; temperature metering means 40 and 50 and from the $H_2S/SO_2$ probe 80d. Based on these signals, a controlling-computing means determines the flows of feed gases, oxidizing gases, fuel, if any, or water, if any, and actuates flow modulating means 45b, 46b, 47b, 48b, 49b, 50b, 57b and 59b so that the optimum high temperature is provided in the products of incomplete combustion entering the heat recovery boiler 4 to maximize sulfur recovery maintaining the desired $H_2S/SO_2$ ratio across the entire process train. Optimal temperature settings are provided by the operator or computed by the controlling-computing means based on the feed gas composition during the period of operation.

As a further advance of the process, control may be provided by the computing-controlling means receiving and interpreting electrical signals representing the $H_2S/SO_2$ ratio from probes 80a,b,c and 85; the flow rates from flow metering means 81a,b,c, and 86 and the electrical signals representing pressures from pressure transducers 90a,b located on feed gas line 5 and on the tail gas line 27. The optimal feed rates of the first and second oxidizing gases directed into the combustion process step and the optimal additions of either first, or second oxidizing gas or both in the second step are computed. The signals are transferred to the flow modulating means 46b, 47b, 49b, 65b, 57b, 59b, and 82a,b,c and 83a,b,c and the flows of oxidizing gases are corrected to maintain the maximum sulfur recovery in the entire process train by maintaining the total amount of oxygen being delivered with the oxidizing gases at a level providing optimal $H_2S/SO_2$ ratio which is varied across the Claus process.

In addition, for a system using multiple thermal stages, a controlling means for distribution of oxidizing gases between stages as well as means for controlling the amount of bypassing gases in lines 125 and 126 may be provided.

Figure 4:
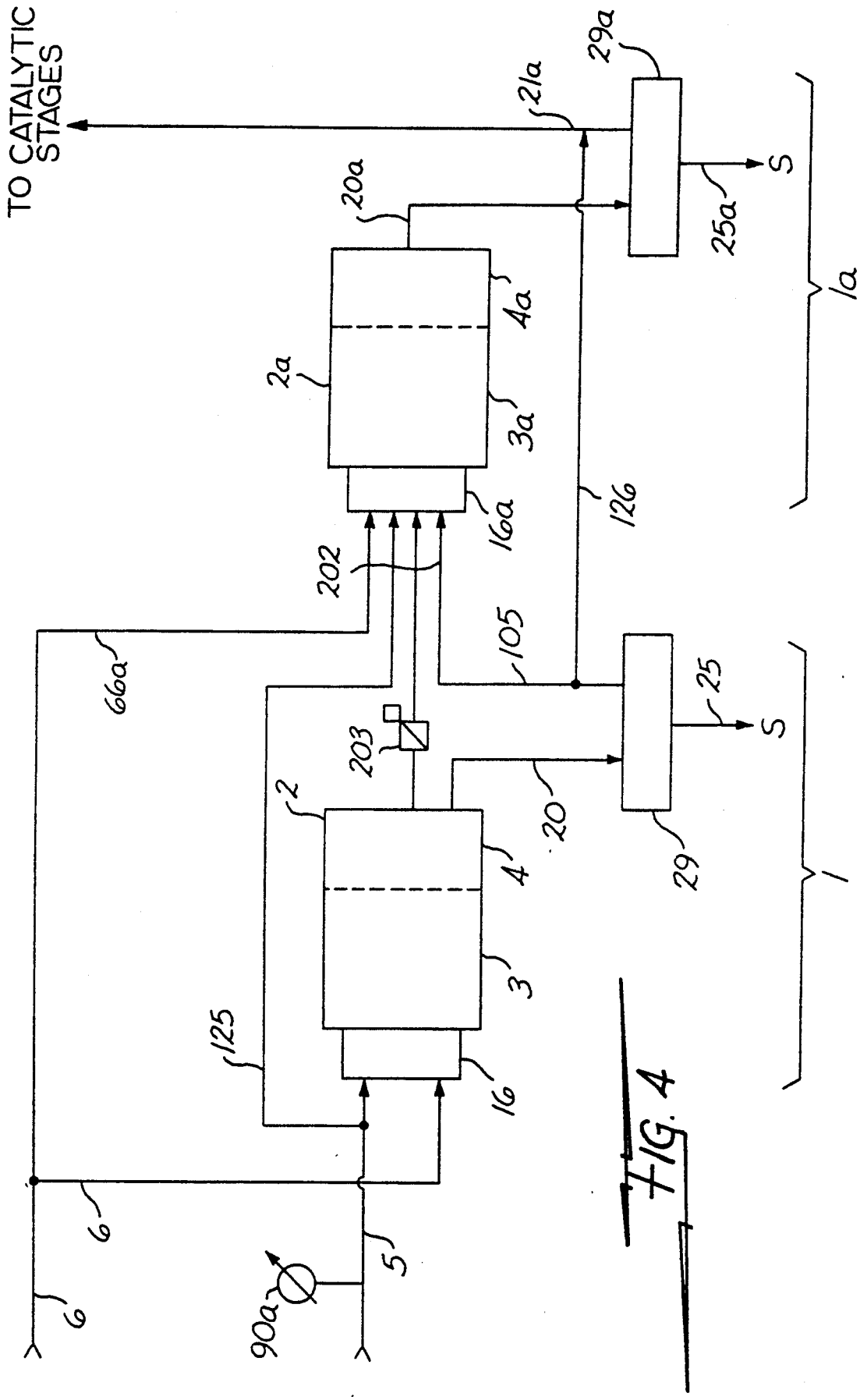
FIG. 4 is a schematic of the improved Claus system having a bypass line.
Figure 5:
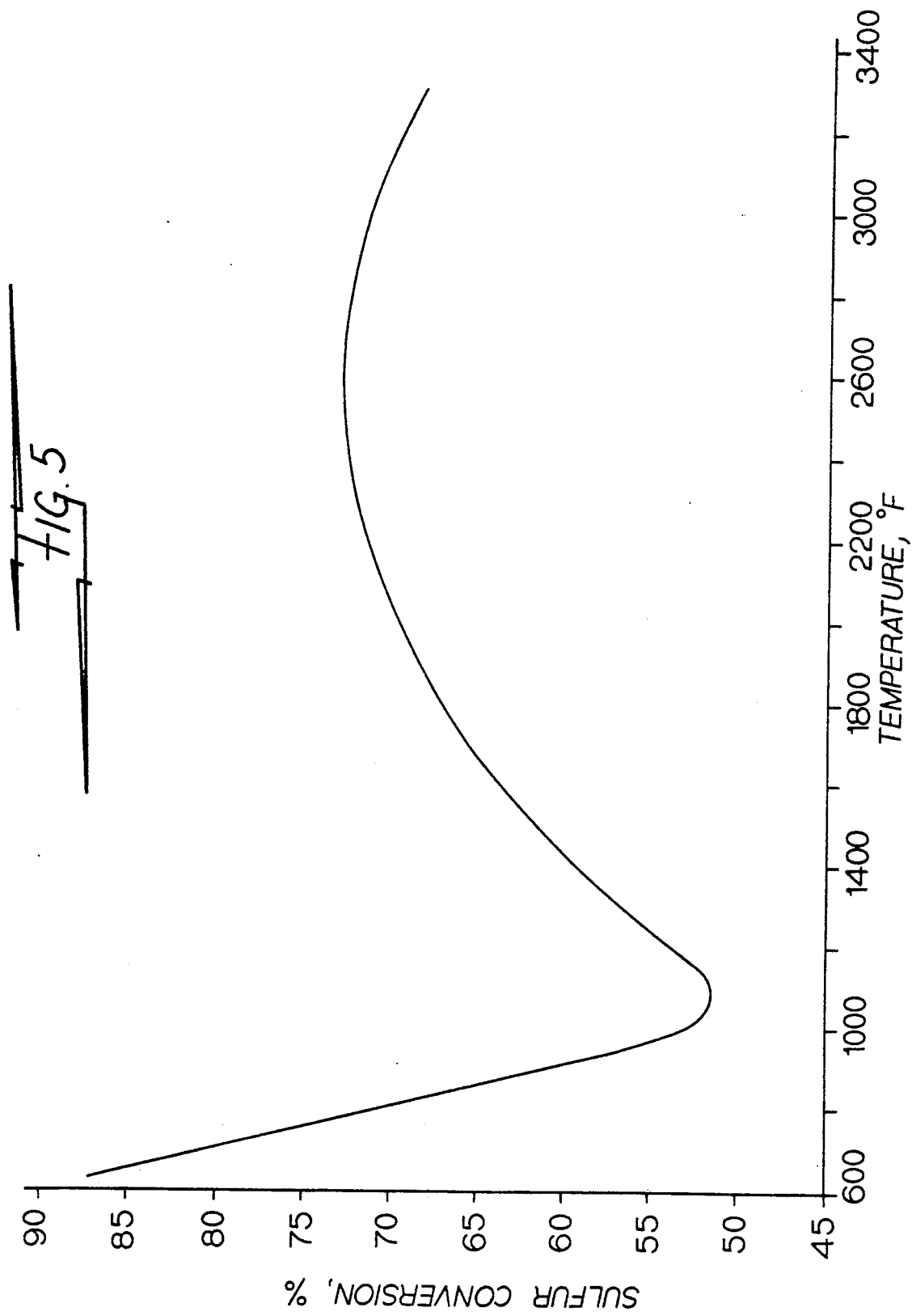
FIG. 5 is a graph which demonstrates a curve indicating sulfur conversion versus temperature having a distinct minima and maxima.

FIG. 4 is a flow diagram of a modified sulfur recovery process including two combustion units 2, 2a, including two boilers 4, 4a, two sulfur condensers 29, 29a, as well as line 202 which has a motorized valve 203.

Line 202 and valve 203 are used to direct to the second combustion unit 2a a controllable fraction of the primary gaseous sulfur in a fraction of the products of incomplete combustion produced from the combustion of gaseous materials containing hydrogen sulfide in the first combustion unit 2 and cooled in the first boiler 4 to temperatures between 600°–1100° F. The second combustion unit 2a is used to react the fraction of primary gaseous sulfur thereto and at least a fraction of products of incomplete combustion delivered from the first combustion unit 2 with a temperature of approximately 600°–1100° F. The remaining fraction of products of incomplete combustion which have been formed in the first combustion unit 2 and directed through the first boiler 4 is further directed through line 20 through the first sulfur condenser 29 in order to condense the primary gaseous sulfur and further cool the products of incomplete combustion to approximately 350° F. or less prior to introduction into the second combustion unit 2a. Finally, a controllable amount of oxidizing gas having an average oxygen content above 21% may be delivered via line 5 to both thermal stages from a source of oxygen enriched air or as two separate oxidizing gases having different oxygen content, for example, air and oxygen, or oxygen and oxygen enriched air, or air and oxygen enriched air.

Optionally, a fraction of gaseous material containing hydrogen sulfide may be directed to the second combustion unit 2a through optional bypass 66a. Also optionally, the oxidizing gas which is used in the second combustion unit 2a may be a fraction of oxidizing gas that has been used in the first combustion unit 4 and may be directed to the second combustion unit 2a through optional line 125. Also optionally, a fraction of the products of incomplete combustion may be directed by optional bypass line 126 downstream of the second condenser 29a. These options result in increasing the temperature in the second reaction stage and will aid in increasing the amount of sulfur recovered in the second stage.

Bypass line 202 is used to increase the flexibility of the process in order to reduce the amount of heat evacuated from the process during the first thermal stage and to raise the temperature in the second combustion unit 2a. This embodiment will find application where oxygen rich oxidizing gas is used to increase the throughput of the air based system by adding the second thermal stage and wherein the needed throughput increase is less than 40% and/or the concentration of hydrogen sulfide is not very high (less than 75%).

The gases passing through the first condenser 29 are cooled from approximately 1000° F. to a condenser exit temperature of typically less than 350° F. These gases subsequently have to be reheated in the second thermal stage which necessitates the elimination of a large portion of the nitrogen through the input of oxygen in order to maintain a sufficient temperature in the second thermal reactor 3a.

While the above description contains many specificities, these should not be construed as limitations on the scope of the invention, but rather as an exemplification of one preferred embodiment thereof. It will be understood that variations and modifications can be effected within the spirit and scope of the invention as previously described and as defined by the claims.

What is claimed is:

1. A method of recovering sulfur from gaseous materials containing hydrogen sulfide, comprising the steps of:
   (a) reacting a first gaseous material with first oxidizing gas in a first reaction step to form first products of incomplete combustion including primary gaseous sulfur, sulfur dioxide and uncombusted hydrogen sulfide;
   (b) first cooling said first products of incomplete combustion in first cooling means;
   (c) directing a first fraction of said cooled first products of incomplete combustion to first condensing means;
   (d) first condensing said first fraction of said cooled first products of incomplete combustion in a first condensing means to form collectable sulfur and gaseous product;
   (e) reacting said gaseous products leaving said first condensing means and the remaining fraction of said cooled first products of incomplete combustion with second oxidizing gas in a second reaction step to form second products of incomplete combustion including gaseous sulfur;
   (f) second cooling said second products of incomplete combustion in second cooling means;
   (g) second codensing said cooled second products of incomplete combustion in second condensing means to form collectable sulfur; and
   (h) mixing a fraction of said first products of incomplete combustion leaving said first condensing step with said second products of incomplete combustion leaving said second condensing step, said first products of incomplete combustion bypassing said second reaction step and said second cooling step.

* * * * *